(12) United States Patent
Hoagland et al.

(10) Patent No.: US 6,170,862 B1
(45) Date of Patent: Jan. 9, 2001

(54) MOTOR VEHICLE STEERING COLUMN SAFETY DEVICE

(75) Inventors: Larry D. Hoagland, Noblesville; William V. Hoagland, Greencastle, both of IN (US)

(73) Assignee: Unique Technologies, L.P., Carmel, IN (US)

( * ) Notice: Under 35 U.S.C. 154(b), the term of this patent shall be extended for 0 days.

(21) Appl. No.: 09/129,396

(22) Filed: Aug. 5, 1998

Related U.S. Application Data

(63) Continuation-in-part of application No. 08/654,905, filed on May 22, 1996, now Pat. No. 5,893,580.

(51) Int. Cl.[7] .................................................. B60R 21/22
(52) U.S. Cl. ........................................... 280/731; 280/777
(58) Field of Search ..................................... 280/731, 777

(56) References Cited

U.S. PATENT DOCUMENTS

| 3,632,135 | * | 1/1972 | Chute ................... | 280/731 |
| 3,752,500 | * | 8/1973 | Culver .................. | 280/736 |
| 5,893,580 | * | 4/1999 | Hoagland et al. ...... | 280/731 |

FOREIGN PATENT DOCUMENTS

2408174  *  9/1974  (DE) ..................................... 280/777

* cited by examiner

Primary Examiner—Eric Culbreth
(74) Attorney, Agent, or Firm—Woodard, Emhardt, Naughton, Moriarty & McNett (57) ABSTRACT

A steering column safety device for use in a motor vehicle having a steering wheel for communicating steering torque to a steering mechanism, and having a collision sensing assembly for sensing a collision, includes a hollow cylinder having a top end and a bottom end, the top end being sized and configured for fixed, torque-transmitting connection to a steering wheel; a piston residing within the cylinder for sliding, telescopic reciprocation between an extended position and a collapsed position; an elongated rod with first and second ends, the first end being secured to the piston and the second end being sized and configured for fixed, torque-transmitting connection to the steering mechanism; structure for transmitting torque between the cylinder and the rod; a sealing assembly for sealing the hollow cylinder to define a fluid-tight cavity within the hollow cylinder between the piston and the top end of the cylinder, the fluid-tight cavity containing prior-to-collision pressurized gas; and, a mechanism to rapidly open the sealing assembly in response to a signal generated by the collision sensing assembly, thereby permitting movement of the hollow cylinder from the extended position to the collapsed position.

2 Claims, 6 Drawing Sheets

MOTOR VEHICLE STEERING COLUMN SAFETY DEVICE

This is a Continuation-in part of application U.S. Ser. No. 08/654,905 filed May 22, 1996 now U.S. Pat. No. 5,893,580 and thus, is entitled to the same filing date of such application for the subject matter in common with that application.

BACKGROUND

The present invention pertains to automobile occupant safety apparatus and more particularly pertains to a motor vehicle steering column safety device.

Although analysis shows that vehicle air bag cushion systems are working generally as intended, these systems still have some drawbacks. According to the National Highway Traffic Safety Administration (NHTSA), present "explosive-type" air bag inflator devices deploy air bags at speeds of approximately 200 mph. Data collected by NHTSA show that small-stature occupants who must sit closer to the steering wheel than average-sized occupants are especially vulnerable to injury due to the force of the deploying air bag. This is especially the case in low-speed collisions. These devices have caused serious injury and death to small-statured individuals, children, out-of-position occupants, and unbelted or improperly belted occupants, all of whom are closer to the air bag than an average-sized belt-restrained occupant upon vehicle collision.

A collapsible steering column also has been recognized as desirable to provide an added safety factor for all vehicle occupants. Some prior systems combine the collapsible steering column and air bag devices together, but the prior art depends upon two independent systems: (1) an air bag inflator system, and (2) an independent steering column collapsing means.

Two independent systems take longer to achieve the desired result than a single actuating means. None of the preceding devices collapses the steering column concurrently with inflating the air bag, and the timing of air bag inflation and steering column collapse may be the difference between life and death. Other energy absorbing steering columns have also been developed, but upon collision these apparatus deform and (1) make it impossible for the driver to transmit steering torque and/or (2) jeopardize rapid and efficient air bag inflation.

Finally, it is important that a collapsible steering column and air bag safety device meet original equipment manufacturer's (OEM) specifications and government standards and be economically feasible to implement into all foreign and domestic fleet automobiles.

Therefore, it is highly desirable to provide a new motor vehicle steering column safety device.

It is also highly desirable to provide a new motor vehicle steering column safety device that inflates an air bag faster than explosive-type inflator systems.

It is also highly desirable to provide a new motor vehicle steering column safety device that is capable of protecting small-stature individuals, children, out-of-position occupants, and unbelted or improperly belted occupants.

It is also highly desirable to provide a new motor vehicle steering column safety device that collapses the steering column concurrently with inflating an air bag.

It is also highly desirable to provide a new motor vehicle steering column safety device capable of delivering steering torque while collapsing the steering column concurrently with inflating an air bag cushion upon collision.

It is also highly desirable to provide a new motor vehicle steering column safety device that meets all of the original equipment manufacturer's (OEM) specifications and required regulations, can be cheaply manufactured and easily installed into any make and model of vehicle.

It is finally highly desirable to provide a new motor vehicle steering column safety device which meets all of the above desired features.

SUMMARY

It is an object of the invention to provide a new motor vehicle steering column safety device.

It is also an object of the invention to provide a new motor vehicle steering column safety device that inflates an air bag faster than explosive-type inflator systems.

It is also an object of the invention to provide a new motor vehicle steering column safety device that is capable of protecting small-stature individuals, children, out-of-position occupants, and unbelted or improperly belted occupants.

It is also an object of the invention to provide a new motor vehicle steering column safety device that collapses the steering column concurrently with inflating an air bag.

It is also an object of the invention to provide a new motor vehicle steering column safety device capable of delivering steering torque while collapsing the steering column concurrently with inflating an air bag cushion upon collision.

It is also an object of the invention to provide a new motor vehicle steering column safety device that meets all of the original equipment manufacturer's (OEM) specifications and required regulations, can be cheaply manufactured and easily installed into any make and model of vehicle.

It is finally an object of the invention to provide a new motor vehicle steering column safety device which meets all of the above desired features.

In the broader aspects of the invention there is provided a collapsible steering column for a motor vehicle that has an elongated hollow cylinder slidably mounted on a piston while also fast to the piston for rotary movement. The space between the interior wall of the cylinder and the piston is sealed in a gas-tight fashion. A head is attached to the top of the cylinder. The head has a frangible seal hermetically secured inside it so that the top of the piston, the interior wall of the cylinder and the seal define an air cavity. The cavity is under pressure such that the cylinder is supported by a column of pressurized gas. A coil spring inside the cylinder urges the piston and the bottom of the cylinder apart. The seal has a bore in which resides an explosive compound. Lead lines connect the explosive compound with an electronic collision sensor, which is located in the front of the vehicle. When a collision occurs, the sensor sends an electronic signal which ignites the explosive compound and fractures the seal permitting the gas to escape from the cavity causing collapse of the cylinder. The vehicle's steering wheel is secured to the top of the head, and the piston is connected by way of appropriate linkages to the front wheels of the vehicle so that axial rotation of the cylinder, by way of the steering wheel, causes the front wheels to turn in accordance with normal vehicle operations. An air bag stowed in the steering wheel may be connected to the top of the head to capture the air released from the cavity providing additional protection to the occupant.

DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION

Figure 1:
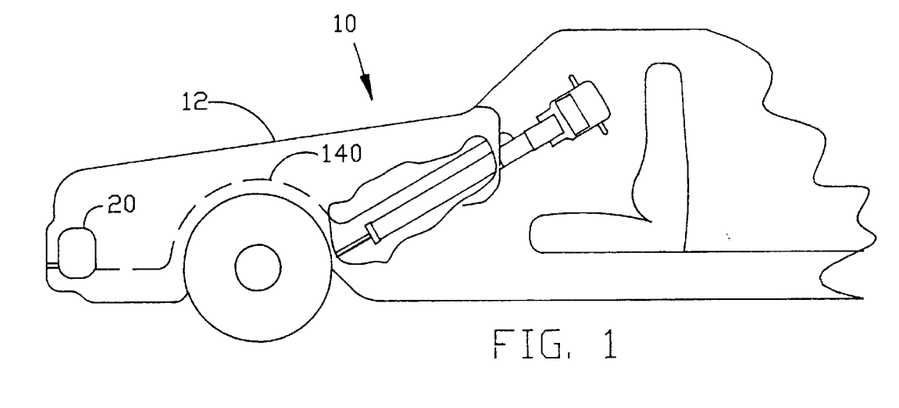
FIG. 1 is a fragmentary side view of a motor vehicle showing the steering column safety device in the extended position.
Figure 1A:
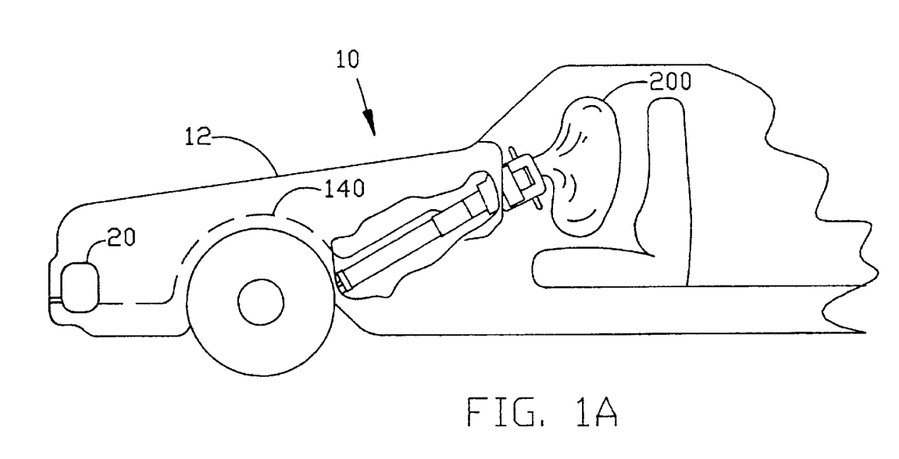
FIG. 1a is a fragmentary side view of a motor vehicle showing the steering column safety device in the collapsed position.
Figure 2:
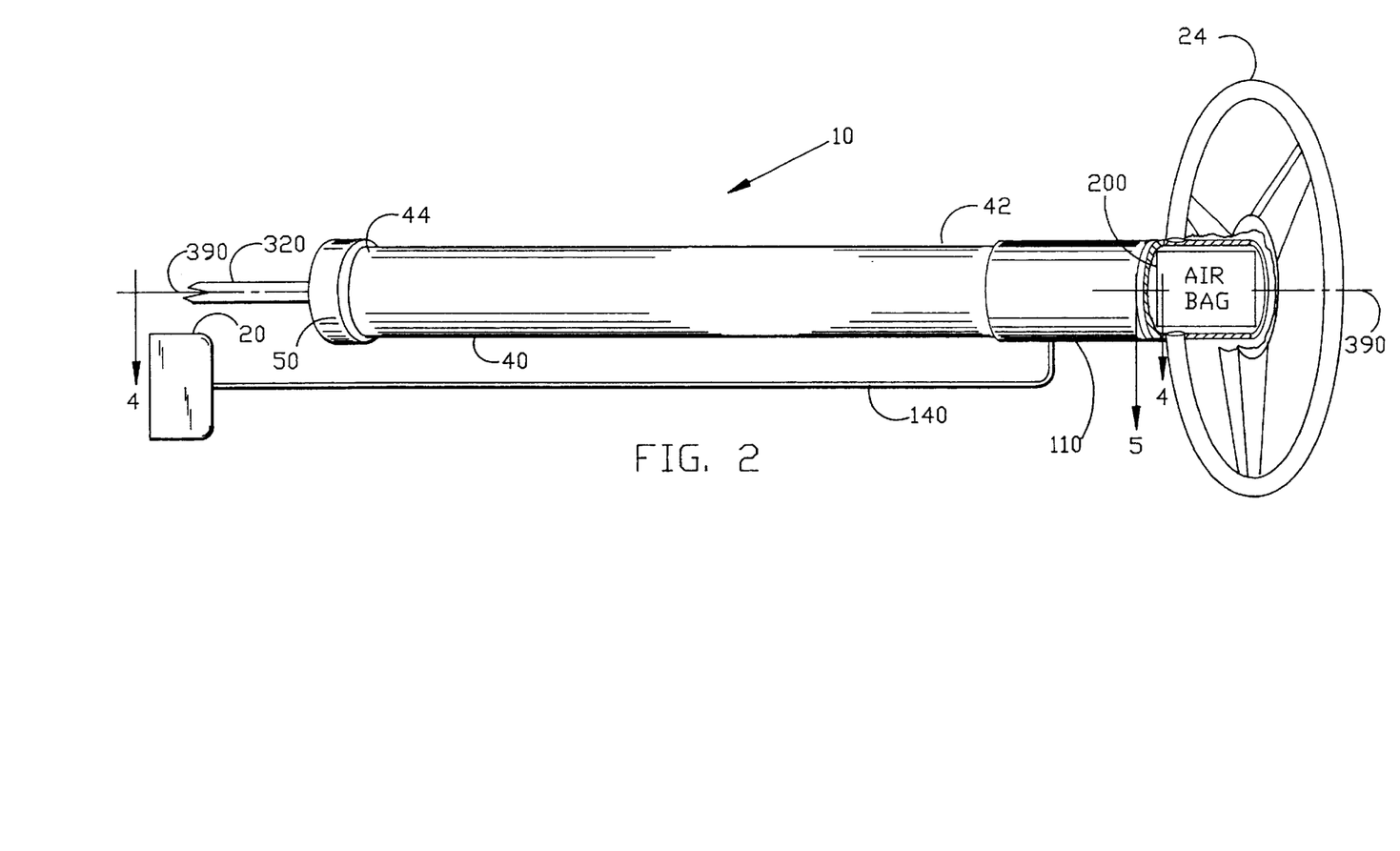
FIG. 2 is a side elevational perspective view of the steering column safety device of the invention.
Figure 3:
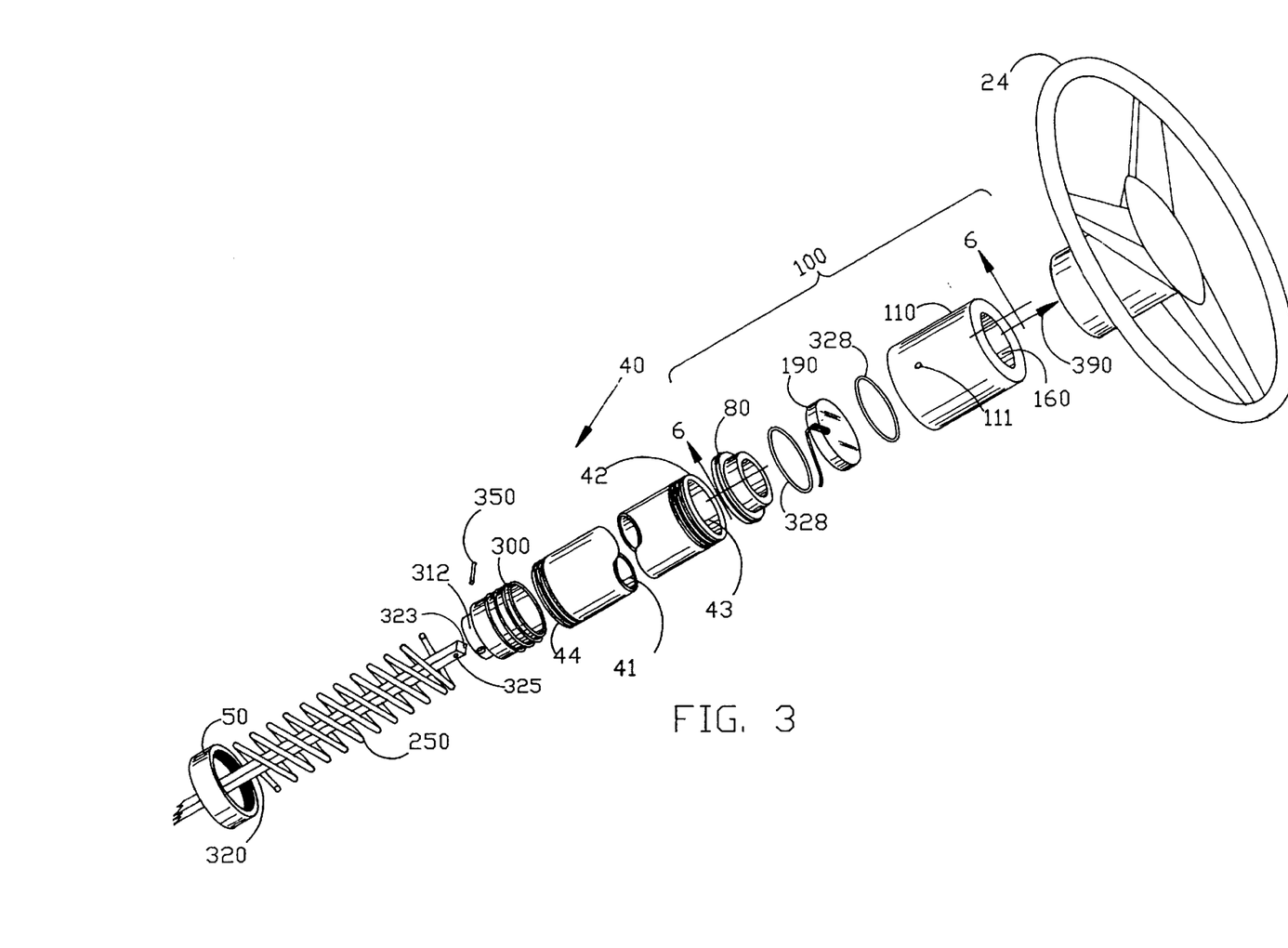
FIG. 3 is a side elevational perspective view of an embodiment of the steering column safety device shown disassembled.

FIGS. 1 and 1A show steering column safety device 10 mounted in motor vehicle 12. Electronic collision sensing means 20, which is shown diagrammatically, is connected to steering column safety device 10 by wires 140. Collision sensing means 20 is usually located in the front of vehicle 12 and has a microprocessor which produces the electronic signal for actuating safety device 10. Referring to FIGS. 2–5, steering column safety device 10 includes hollow cylinder 40, head 110, cap 50, interior wall 41 connecting the top 42 of cylinder 40 with its bottom 44 and axial rod 320. Cylinder 40, head 110, cap 50, and axial rod 320 are generally axially aligned along axis 390 and formed from machinable metal, such as aluminum, brass, and/or steel alloy as desired. Cylinder 40, head 110 and cap 50 may be insulated by known means or formed from an insulating material which is rigid and capable of containing elevated gas pressures of about 600 to 1,000 p.s.i. Head 110 is secured to top 42 of cylinder 40, and cap 50 is secured to bottom 44 of cylinder 40 by known means, such as threads 82. In an embodiment, the top of cylinder 40 and head 110 are secured together in a gas-tight fashion. Pressurized gas from atmospheric pressure to elevated pressures is contained in hollow cylinder 40.

Figure 11:
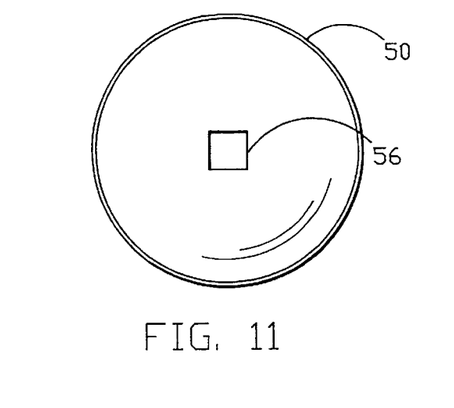
FIG. 11 is a bottom view of an embodiment of the cap of the invention.

The top of head 110 is adapted for receiving standard steering wheel 24 in which resides air bag 200. Cap 50 has bore 56 extending therethrough, as shown in FIG. 11. The shape of bore 56 is the same as the cross-section of axial rod 320, and tolerances of bore 56 and axial rod 320 are such as to accommodate axial movement of cap 50 with cylinder 40 and head 110 as a single unit along axial rod 320. The preferred embodiment includes axial rod 320 having a square cross-section. In that embodiment, bore 56 is configured to the shape of a square such that bore 56 receives rod 320 and steering torque can be transmitted to the steering mechanism of vehicle 12 via steering wheel 24, cylinder 40, cap 50 and axial rod 320, which all rotate as a single unit about axis 390.

Figure 5:
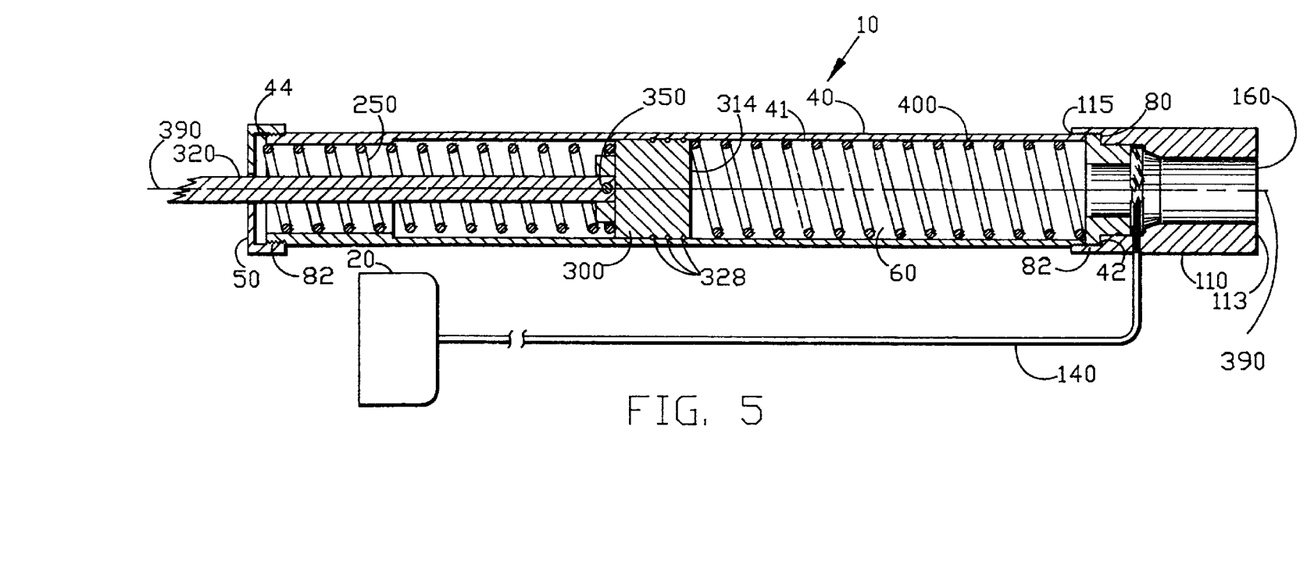
FIG. 5 is a side cross-sectional view like the view shown in FIG. 4 except the steering column safety device of the invention is in the collapsed position.

Inside hollow cylinder 40 is air cavity 60 for containing pressurized gas, piston 300, and biasing means, such as coil spring 250 for biasing piston 300 and cap 50 apart. Another coil spring 400 may also be positioned in cylinder 40 in order to provide a means for damping the force placed on cylinder 40 by an occupant upon collision, as shown in FIG. 5.

Figure 9:
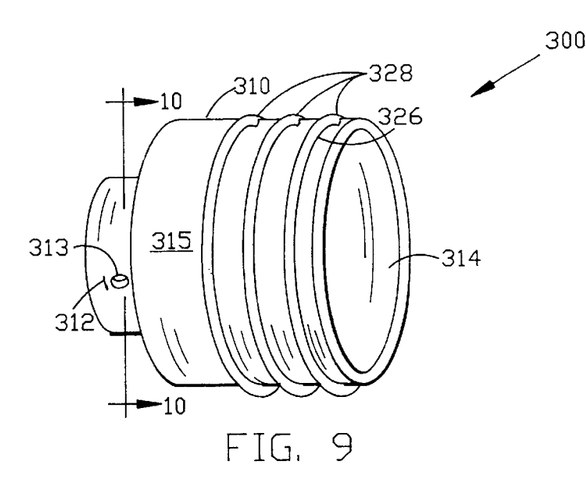
FIG. 9 is an elevated side perspective view showing an embodiment of the piston.
Figure 10:
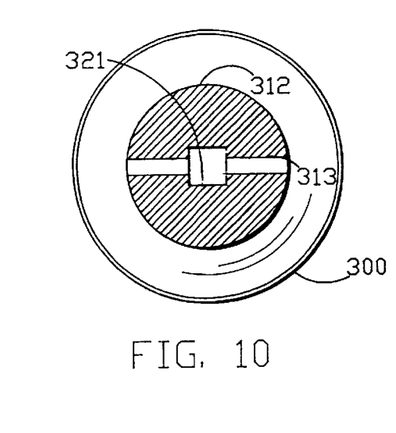
FIG. 10 is a bottom cross-section on the line 10—10 of FIG. 9 in the direction of the arrows showing the boss and piston.

Referring to FIGS. 9 and 10, piston 300 includes generally cylindrical solid body 310 having boss 312 at one end and air cavity surface 314 at the other end. In the preferred embodiment, boss 312 is integrally formed with solid cylindrical body 310. Circumferential wall 315 joins boss 312 with air cavity surface 314. Boss 312 has rod seating bore 321 extending generally axially therein with pin hole 313 extending transversely through boss 312. One embodiment has at least one o-ring groove 326 formed therein where at least one o-ring 328 resides. O-ring(s) 328 engage the interior wall of cylinder 40 in a gas-tight fashion so that o-ring(s) 328, interior wall 41 of cylinder 40 and head 110 define air cavity 60. Piston 300 is formed of machinable metal, such as aluminum, brass, and/or steel alloy as desired, and, in the embodiment shown, axial rod 320 connects boss 312 via roll pin 350 to the steering mechanism of vehicle 12. Piston 300 may be formed of other material or composites thereof, so long as interior wall of cylinder 40 can slidably engage circumferential wall 315 on orings 328.

Referring now to FIGS. 3 and 6–8, top 42 of hollow cylinder 40 has outlet 43, and head 110 is coupled thereto in a gas-tight fashion. In that embodiment, cylinder 40 contains pressurized gas. It is entertained, however, that head 110 is well-suited for use in connection with any pressurized fluid or gas container. Head 110 may be used in any vehicle having a collision sensing means connected thereto for producing a signal in response to a collision, where it is desirable to control the flow of pressurized fluid or gas from a container into an air bag connected inside a vehicle and deployed upon collision to protect an occupant. Thus, air bag 200 may be connected to head 110 using means known in the art. Head 110 includes o-rings 328, seal 190 and spacer member 80. Axial bore 160 extends through head 110 and includes bore wall 162 with entrance port 170, outlet 43 and seal housing 175 formed therein. Entrance port 170 is tapered with the larger end contiguous with seal 190. A generally transverse head bore 111 joins the exterior of head 110 and bore wall 162.

Figure 6:
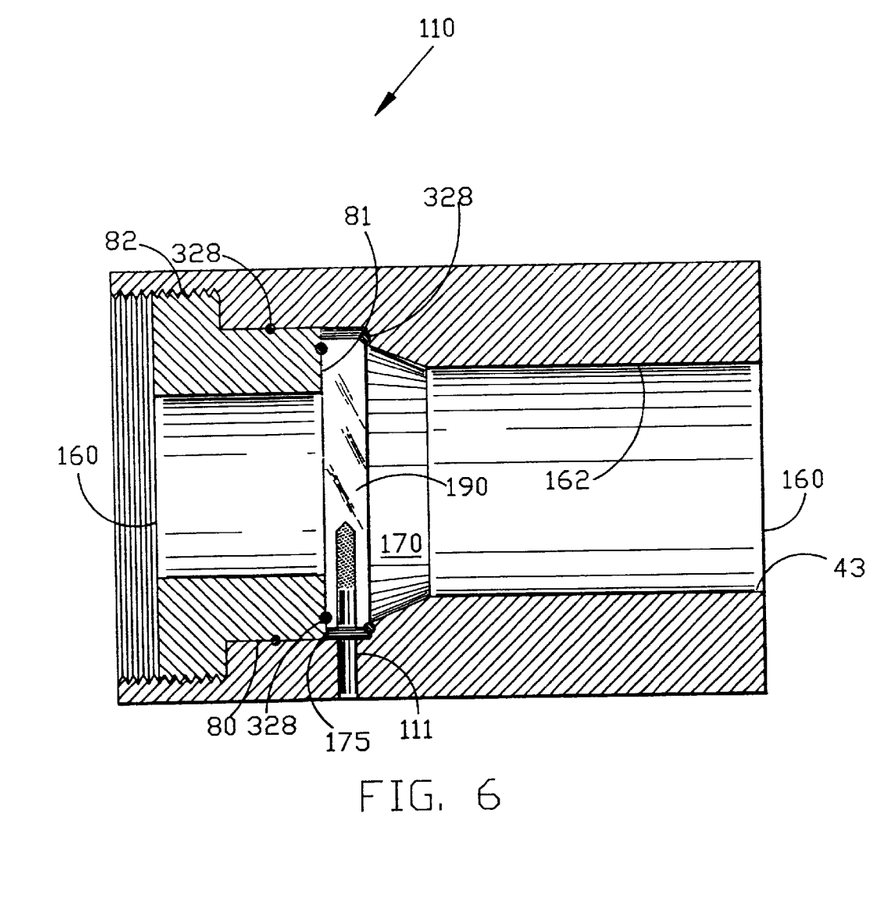
FIG. 6 is a side cross-sectional view of the head of the steering column safety device.
Figure 7:
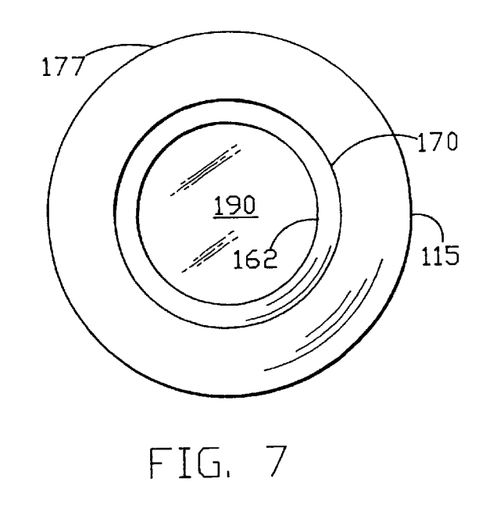
FIG. 7 is a bottom view of an embodiment of the head of the steering column safety device.

Seal 190 is positioned within seal housing 175 and occludes axial bore 160, as shown in FIG. 6. O-rings 328 contact opposite sides 186, 188 of seal 190, and spacer member 80 abuts o-ring 328 contiguous with opposite side 186. Additional o-rings 328 may be positioned between bore wall 162 and spacer member 80 as desired.

Figure 8:
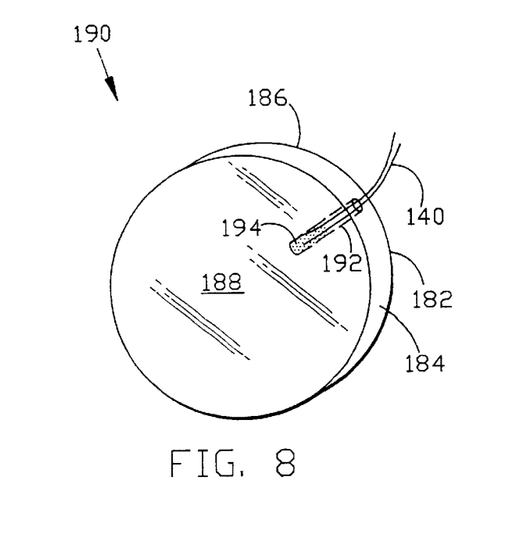
FIG. 8 is an elevated side perspective view showing an embodiment of the seal of the steering column safety device of the invention.

Referring now to FIGS. 6 and 8, seal 190 includes frangible disc-shaped body 182 having opposite sides 186, 188 and wall 184, which joins opposite sides 186, 188. Disc-shaped body 182 may be formed from a number of glass composites and may have tempered or annealed portions as desired. One embodiment has opposite sides 186, 188 formed from a sodium lime glass composition and wall 184 formed from tempered glass. Seal bore 192 extends transversely into wall 184 of seal 190. In that embodiment, tempered glass is well-suited for drilling bore 192 and resists shattering during manufacture. Explosive charge 194 resides in bore 192 and is formed from a mixture of pentaerythritol tetranitrate (PETN), lead azide, potassium perchlorate, and sulfur, for example. Explosive charge 194 requires an ignition temperature suitable for igniting by electrical means, such as a signal produced by sensing means 20. In an embodiment explosive charge 194 has an ignition temperature of about 300 degrees Fahrenheit.

Seal 190 is positioned in seal housing 175 and rotated so that transverse bore 192 containing explosive charge 194 is aligned with head bore 111. Wires 140, therefore, are able to extend from transverse bore 192 through head bore 111 to the exterior of steering column safety device 10 connecting explosive charge 194 to sensing means 20.

In operation, prior to collision, head 110, including its contents secured as above-described, threadedly engages top 42 of cylinder 40 and is sealed by known means, such as pipe dope or tape. Pressurized gas or fluid is pumped into cavity 60 using known valving apparatus, such as a Schrader valve for example, connecting the exterior and interior of cavity 60 (not shown). This provides for steering column device 10 to be easily refueled after deployment avoiding the inconvenience of shipping steering column safety device 10 to the manufacturer in the event vehicle 12 is still operational.

Figure 4:
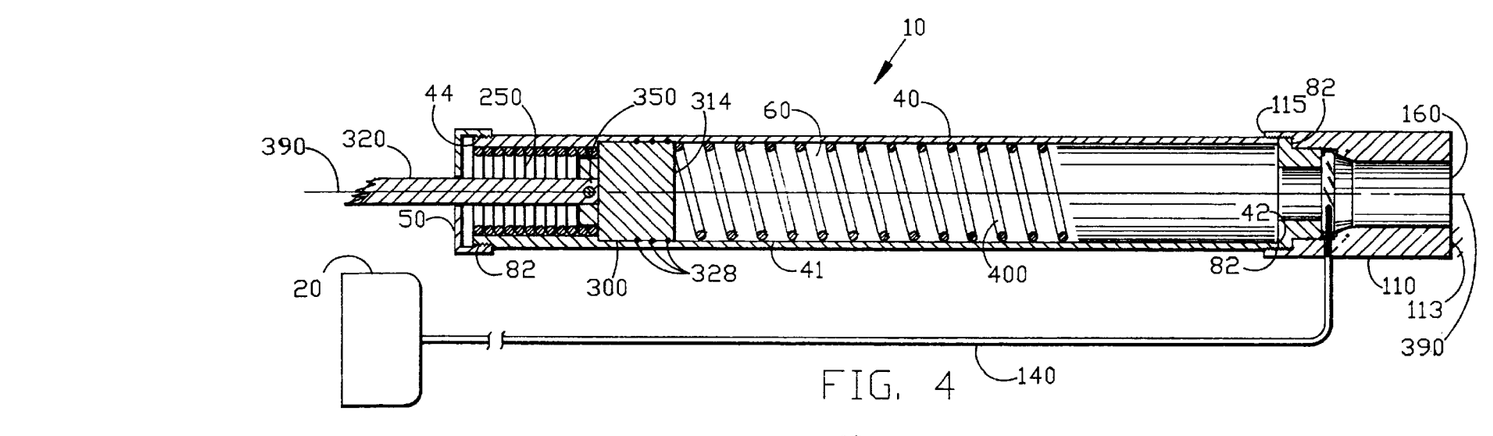
FIG. 4 is a side cross-section on the line 4—4 of FIG. 2 in the direction of the arrows showing the steering column safety device of the invention in the extended position.

It is entertained that cavity 60 can be pressurized upon manufacture as well. A breathable anhydrous gas such as nitrogen is preferred, because it is nontoxic and contains no water of crystalization. As the pressure inside cavity 60 is elevated, cylinder 40, head 110 and cap 50 all move forward axially as a single unit relative to piston 300 and axial rod 320, until reaching the extended position, as shown in FIGS. 1 and 4. Biasing means, such as coil spring 250, assumes a compressed condition. Damping means, such as coil spring 400, as shown in FIG. 5, is for the most part generally relaxed in the extended position, the collapsed position and therebetween. Steering column safety device 10 is capable of delivering steering torque and thus, is fully operational assuming normal vehicle steering column functions.

The occupant may deliver steering torque by way of steering wheel 24. Steering torque is delivered to the steering mechanism of the vehicle via head 110, cylinder 40, piston 300, cap 50 and axial rod 320, which all rotate as a single unit about axis 390. O-rings 328 on piston 300 engage the interior wall of cylinder 40 and displace rotational force from cylinder 40 to piston 300 and axial rod 320. In other words, the side walls of bore 56 engage axial rod 320 transferring steering torque from steering wheel 24 to axial rod 320 via piston 300 during the extended position, the collapsed position and therebetween.

Upon collision, sensing means 20 produces a signal, which is communicated through wire 140 to head 110. Wire 140 resides within head bore 111 and contacts explosive charge 194. The signal ignites charge 194 causing charge 194 to explode such that a breach is formed in body 182, thereby allowing rapid free flow of pressurized gas from air cavity 60 into air bag 200 via entrance port 170 and axial bore 160. The amount and composition of explosive charge 194 determines the noise level and size of the breach formed in body 182. In an embodiment, a small explosive charge 194 is provided such that body 182 is only cracked or fragmented so that the rush of pressurized gas from air cavity 60 completes the destruction of seal 190.

Concurrently with the flow of gas out of cavity 60, biasing means, such as coil spring 250, rapidly assumes the relaxed position forcing cap 50 and boss 312 apart moving cylinder 40 axially rearwardly from the extended position to the collapsed position, as shown, respectively, in FIGS. 1, 1A and 4, 5. Air cavity 60 and head 110 are generally axially aligned such that the pressurized gas flows generally axially out of cavity 60. The collapsing action of the cavity 60 forces pressurized gas out of cavity 60 axially at a rate exceeding a free flow. In addition, entrance port 170 guides the pressurized gas into the shape of a whirling vortex maximizing the rate at which pressurized gas flows from the cavity 60 and into air bag 200. The rate of flow of the gas into the air bag far exceeds the rate of explosive-type air bag inflators without the use of toxic chemicals such as sodium azide.

Moreover, the same superior rates of collapse of the steering wheel column, like cylinder 40 for example, and inflation of air bag 200 can easily be achieved regardless of the make or model of the vehicle. The length and diameter of cylinder 40, axial bore 160, entrance port 170, the degree of the taper of entrance port 170, the gauge of coil spring 250, the length of movement between the extended position and the collapsed position, the amount and size of explosive charge 194, and so on, may all be adjusted to achieve the desired result specific to any make or model of vehicle.

Steering column safety device 10 of the invention discloses a generally axially aligned system that rapidly expands the inflator gas into the air bag cushion without utilizing explosive substances. Ignition of explosive charge 194 makes a sound similar to that of a child's cap gun whereby the occupant is not frightened and shattering of the vehicle's windows is precluded.

Moreover, the steering column safety device 10 of the invention is capable of delivering steering torque while collapsing the steering column concurrently with inflating an air bag upon collision. In addition, there is no incentive to steal steering wheel 24, since it is a standard steering wheel 24 and not a fully operational safety device: it contains no inflator gases and is useless without head 110 and cylinder 40.

Steering column safety device 10 collapses the steering column concurrently with inflating an air bag 200 without using pulleys, cables and/or other movable parts which can break or become worn and provides a faster, more efficient collapsible steering column than heretofore available. Thus, steering column safety device 10 is capable of providing added safety for all occupants, regardless of size, non-belt-restrained occupants and out-of-position occupants.

Finally, new motor vehicle steering column safety device 10 meets original equipment manufacturer's (OEM) specifications and all of the required regulations, and novel motor vehicle steering column safety device 10 can be cheaply manufactured and easily installed into any make and model of vehicle.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. A steering column safety device for use in a motor vehicle having a steering wheel for communicating steering torque to a steering mechanism, and having collision sensing means for sensing a collision, the steering column safety device comprising:

a hollow cylinder having a top end and a bottom end, the top end being sized and configured for fixed, torque-transmitting connection to a steering wheel;

a piston residing within the cylinder for sliding, telescopic reciprocation between an extended position and a collapsed position;

an elongated rod with first and second ends, the first end being secured to the piston and the second end being sized and configured for fixed, torque-transmitting connection to the steering mechanism;

means for transmitting torque between said cylinder and said rod;

sealing means for sealing the hollow cylinder to define a fluid-tight cavity within the hollow cylinder between said piston and the top end of said cylinder, the fluid-tight cavity containing prior-to-collision pressurized gas; and, opening means to rapidly open the sealing means in response to a signal generated by the collision sensing means, thereby permitting movement of the hollow cylinder from the extended position to the collapsed position.

2. The steering column safety device of claim 1 further including an air bag connectable with one of said cylinder and the steering wheel for inflation from said cylinder upon rapid opening of said sealing means.

\* \* \* \* \*